(12) United States Patent
Neupert

(10) Patent No.: US 9,514,588 B2
(45) Date of Patent: Dec. 6, 2016

(54) MODULAR VEHICLE SYSTEM, ELECTRIC VEHICLE AND MODULE FOR CONNECTING TO AN ELECTRIC VEHICLE

(75) Inventor: Hannes Neupert, Tanna (DE)

(73) Assignee: EnergyBus e.V., Tanna (DE)

(*) Notice: Subject to any disclaimer, the term of this patent is extended or adjusted under 35 U.S.C. 154(b) by 69 days.

(21) Appl. No.: 13/984,014

(22) PCT Filed: Feb. 7, 2012

(86) PCT No.: PCT/EP2012/052055
§ 371 (c)(1),
(2), (4) Date: Aug. 6, 2013

(87) PCT Pub. No.: WO2012/107448
PCT Pub. Date: Aug. 16, 2012

(65) Prior Publication Data
US 2013/0314205 A1    Nov. 28, 2013

(30) Foreign Application Priority Data

Feb. 7, 2011    (DE) .................. 10 2011 003 724

(51) Int. Cl.
*B60L 11/18*    (2006.01)
*G07C 9/00*    (2006.01)
(Continued)

(52) U.S. Cl.
CPC .......... *G07C 9/00896* (2013.01); *B60L 11/007* (2013.01); *B60L 11/1818* (2013.01);
(Continued)

(58) Field of Classification Search
CPC ...... Y02T 90/12; Y02T 90/125; Y02T 90/128; Y02T 90/14; Y02T 90/169; B60L 11/1809; B60L 11/1816; B60L 11/1818; B60L 2200/12; B60L 2270/30; B60L 2270/36; B62H 5/00; B62M 6/40; H01R 13/6397
(Continued)

(56) References Cited

U.S. PATENT DOCUMENTS 5,917,407 A * 6/1999 Squire .................. B62H 3/00
                                                    194/205
7,726,160 B2   6/2010 Gagosz et al.
(Continued)

FOREIGN PATENT DOCUMENTS

CN    201210314 Y    3/2009
CN    101400542 A    4/2009
(Continued)

OTHER PUBLICATIONS

International Search Report, dated May 31, 2012 (English translation as provided by WIPO).
(Continued)

*Primary Examiner* — Benjamin C Lee
*Assistant Examiner* — Benyam Haile
(74) *Attorney, Agent, or Firm* — Dienwiebel Transatlantic IP

(57) ABSTRACT

The invention relates to a modular vehicle system, having an electric vehicle (2, 2'), in particular a lightweight electric vehicle, and at least one module (3, 120) which can be connected to the electric vehicle (2, 2'). The electric vehicle (2, 2') has at least one on-board power supply system (13, 101) for supplying energy to an electrical drive unit (114), one or more interfaces (4, 114) which are connected to the on-board power supply system (13, 101) and are intended for connecting at least one module (3, 120), and a first locking means (9) which is arranged on the interface (4, 4', 114). The at least one module (3, 120) has at least one
(Continued)

electrical arrangement, a connecting element (6, 6', 121) which can be connected disconnectably to the interface (4, 4', 114) and has the purpose of connecting the electrical arrangement to the on-board power supply system (13, 101), and a second locking means (11) which is arranged on the connecting element (6, 6', 121) and which is designed to engage with the first locking means (9). In order to provide a modular vehicle system (1) which has increased operational reliability and in which the connection to a module (3, 120) can be made in a particularly easy and secure fashion such that it is protected against intervention by unauthorized persons, at least one of the locking means (9, 11) can be moved between a free position and a locking position, wherein in the free position the connecting element (6, 6', 121) can be disconnected from the interface (4, 4', 114), and in the locked position the connecting element (6, 6', 121) is mechanically locked to the interface (4, 4', 114).

20 Claims, 7 Drawing Sheets

(51) Int. Cl.
 B60L 11/00 (2006.01)
 B62M 6/40 (2010.01)
 H04L 12/40 (2006.01)

(52) U.S. Cl.
 CPC ....... *B60L 11/1825* (2013.01); *B60L 11/1846* (2013.01); *B62M 6/40* (2013.01); *B60L 2200/12* (2013.01); *B60L 2240/70* (2013.01); *B60L 2270/36* (2013.01); *H04L 2012/40273* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
 USPC ... 439/345, 346, 347, 352; 70/233; 320/109; 340/5.2, 5.8
 See application file for complete search history.

(56) References Cited

U.S. PATENT DOCUMENTS

| | | | |
|---|---|---|---|
| 7,950,943 B2 | 5/2011 | Ohtomo | |
| 2002/0152398 A1 | 10/2002 | Krumrein | |
| 2004/0073791 A1 | 4/2004 | Vollmer et al. | |
| 2007/0080662 A1 | 4/2007 | Wu | |
| 2007/0220933 A1* | 9/2007 | Gagosz et al. | 70/233 |
| 2008/0034820 A1 | 2/2008 | Gagosz et al. | |
| 2008/0297108 A1* | 12/2008 | Le Gars | H01M 10/441 320/109 |
| 2009/0286414 A1 | 11/2009 | Ohtomo | |
| 2010/0207771 A1* | 8/2010 | Trigiani | B60L 11/1816 340/636.1 |
| 2010/0228405 A1* | 9/2010 | Morgal | B62H 3/02 701/2 |
| 2010/0301810 A1 | 12/2010 | Biondo et al. | |
| 2010/0313614 A1 | 12/2010 | Rzepecki | |

FOREIGN PATENT DOCUMENTS

| | | |
|---|---|---|
| CN | 101902063 A | 12/2010 |
| DE | 25 03 033 A1 | 7/1976 |
| DE | 695 01 453 T2 | 6/1998 |
| DE | 10 2004 042 004 A1 | 3/2006 |
| DE | 10 2005 011 487 A1 | 9/2006 |
| DE | 20 2007 002 367.7 U1 | 8/2007 |
| DE | 10 2009 021 720 A1 | 11/2009 |
| DE | 102008048657 A1 | 3/2010 |
| EP | 0709254 A1 | 5/1996 |
| EP | 1092615 A1 | 4/2001 |
| EP | 1 241 061 A2 | 9/2002 |
| EP | 1820721 A1 | 8/2007 |
| EP | 1820722 B2 | 8/2007 |
| EP | 1 025 541 A1 | 5/2008 |
| EP | 1 995 109 A1 | 11/2008 |
| EP | 1995109 A1 | 11/2008 |
| EP | 1 997 686 A2 | 12/2008 |
| EP | 2261108 A2 | 12/2010 |
| FR | 2799785 A1 | 4/2001 |
| FR | 2837781 A | 10/2003 |
| GB | 2 455 551 A | 6/2009 |
| JP | H05-135804 A | 6/1993 |
| JP | 2001 043442 A | 2/2001 |
| JP | 2003 077070 A | 3/2003 |
| JP | 2006 035911 A | 2/2006 |
| KR | 100912377 B1 | 8/2009 |
| KR | 100 968 943 B1 | 7/2010 |
| KR | 100989678 B1 | 10/2010 |
| KR | 20110122023 A | 11/2011 |
| KR | 20120012256 A | 2/2012 |
| KR | 101121147 B1 | 3/2012 |
| KR | 20120036601 A | 4/2012 |
| KR | 20120073163 A | 7/2012 |
| KR | 101178012 B1 | 8/2012 |
| KR | 20120111687 A | 10/2012 |
| KR | 20120114450 A | 10/2012 |
| KR | 20130007502 A | 1/2013 |
| KR | 20130079984 A | 3/2013 |
| KR | 101328744 B1 | 11/2013 |
| KR | 20130128968 A | 11/2013 |
| TW | M363155 U | 8/2009 |
| WO | 02/23801 A2 | 3/2002 |
| WO | 2006024447 A1 | 3/2006 |
| WO | 2006/095092 A | 9/2006 |
| WO | 2006097165 A1 | 9/2006 |
| WO | 2008/157443 A2 | 12/2008 |
| WO | 2009/129623 A1 | 10/2009 |
| WO | 2011 135036 A2 | 11/2011 |
| WO | 2012046950 A1 | 4/2012 |

OTHER PUBLICATIONS

International Preliminary Report on Patentability, dated Aug. 13, 2013 (English translation as provided by WIPO).

Office Action of the German Patent and Trademark Office of Aug. 16, 2011 in priority application No. DE 10 2011 003 724.1, provided with a translation in part.

Document "PLC Park Lock & Charge System" by Karl Koeckeis, dated Oct. 2010.

International Search Report of application PCT/EP2011/056764, dated Sep. 7, 2012 (English translation as provided by WIPO).

International Preliminary Report on Patentability of application PCT/EP2011/056764, dated Dec. 4, 2012 (English translation as provided by WIPO).

Translation of Search Report of SIPO in Application No. 2011800329403 of Energybus e.V.

Translation of Search Report of SIPO in Application No. 2012800080359 of Energybus e.V.

Extended European Search Report of Application EP14197824, Jun. 4, 2015.

\* cited by examiner

MODULAR VEHICLE SYSTEM, ELECTRIC VEHICLE AND MODULE FOR CONNECTING TO AN ELECTRIC VEHICLE

BACKGROUND OF THE INVENTION

The invention relates to a modular vehicle system, an electric vehicle and a module for connection to an electric vehicle.

For some time now, electrically powered vehicles are becoming more and more important in view of increasing energy costs and the demand for reduced emissions of traffic. Particularly in the area of light electric vehicles, where for instance electric bicycles, pedelecs and scooters can be found, but also wheel chairs and quad bikes, a considerable number of vehicle types are commercially available by now.

All vehicles of this type comprise an electric motor that is applied as a sole or additional drive and that is supplied with electric energy by one or more batteries. It is thus necessary to design the electric system of electric vehicles in a way providing a safe and failure-free power supply of the electric motor.

Particularly an accidental disconnecting or connecting of individual components, such as for instance a charging device or a battery, can cause malfunctioning or in the worst case also damages to the electric system of the electric vehicle.

Especially in public areas, for instance at public stationary charging columns or, in case of rental offers, at self-service stations open to the public, there is no control if a correct connection takes place between the charging column or station and the vehicle. Besides, the known connection systems do not guarantee safe protection from third party interferences with the connection between charging column and battery.

It is hence the object to provide a modular vehicle system with increased safety of operation where the connection with a module can take place particularly easy, safe and protected from interferences by unauthorized persons.

SUMMARY

The object is solved by a modular vehicle system according to claim 1, an electric vehicle according to claim 13, a module according to claim 14, and a corresponding method according to claim 15. Preferred embodiments of the invention are described in the dependent claims.

A main aspect of the invention is a separable connection between an interface of an electric vehicle and at least a connecting element of a module, wherein interface and connecting element establish an electrical connection between vehicle and module in a connected operational state and allow a mechanical locking of the components at the same time.

The invention thus allows a safe connection between vehicle and module, increasing the safety of operation and reducing the risk of interference by unauthorized persons. In this context it is particularly advantageous that both the electrical connection and the mechanical locking take place by the at least one interface of the vehicle and the connecting element of the module. The system is thus particularly user-friendly and quick and easy to use.

In the context of the invention, an electric vehicle is understood to mean an electrically powered single- or multi-track vehicle and in particular a road vehicle. Preferably, the electric vehicle is a light electric vehicle, as for instance an electric two-wheeler or three-wheeler or an electric bicycle, pedelec, scooter, wheelchair, quad bike or kart. Particularly preferred is a light electric vehicle with an empty weight of not more than 500 kg, furthermore preferred not more than 350 kg, in each case without accessories as for example batteries.

According to the invention, the electric vehicle comprises at least one on-board power supply system for energy supply of an electric drive unit and one or more interfaces connected to the on-board power supply system for connection of at least one module. Furthermore, a first locking means is provided at the interface.

The at least one module comprises at least one connecting element, separably connectable to the interface of the electric vehicle, an electric arrangement and a second locking means, arranged at the connecting element, that is formed for engagement with the first locking means. Vehicle and module can certainly comprise further components that are however not specified here.

The on-board power supply system of the electric vehicle is designed for energy supply of the electric drive unit and connects at least the drive unit with the at least one interface. The on-board power supply system can certainly in general connect further accordingly formed interfaces, electric components or assemblies of the vehicle, as for example one or more internal batteries, generators, fuel cells, DC/DC converters, motors or other components.

Due to the requirement concerning an energy supply of the electric drive unit, the on-board power supply system is preferably designed for an electric current of at least 3 A, particularly at least 5 A with a voltage of 10V-100V, in particular 24V-60V. Particularly preferred, the on-board power supply system is a direct current power supply system, particularly preferred a 42V DC power supply system.

Based on arrangement and vehicle type, a separate auxiliary on-board supply system may be preferably provided besides the on-board power supply system, supplying additional electric assemblies such as controls, instruments, operating elements and/or lighting devices with electric energy. Particularly preferred the auxiliary on-board supply system is designed for a voltage of 12V or 14V. The auxiliary on-board supply system may comprise its own voltage supply, for example a battery, or may be supplied by the on-board power supply system for instance by means of a converter.

In the context of the present invention, a battery is understood to certainly mean a rechargeable battery, as for example one or more accumulators.

The electric drive unit is used for transformation of electric energy into mechanical energy and can comprise for example one or more electric motors. In this context, the electric drive unit is used preferably as main drive; alternatively or additionally it is however also conceivable that the electric drive unit is used as auxiliary drive, for instance with electric bicycles in addition to a pedal drive.

The electric drive unit can be formed as a direct drive, i.e. as drive without gear mechanism, which is advantageous concerning the energy efficiency. With a light electric vehicle, the electric drive unit is preferably a disc motor. Particularly preferred, the drive unit is a geared motor. Depending on the design of the drive unit, a motor control is provided that is formed for control of the drive power, for instance by means of current and/or voltage control and/or pulse width modulation (PWM).

The at least one interface of the vehicle is formed for connection to the connecting element of the module. Interface and connecting element can in this context be of any suitable design that provides a safe electrical connection between module and on-board power supply system. Certainly, interface and connecting element should be designed correspondingly mechanically adapted to each other.

In view of potential handling by vehicle users, all current-carrying parts should be formed suitably protected against accidental contact, accordingly also interface and connecting element.

The electric module comprises beside the connecting element furthermore an electric arrangement, as already mentioned. The electric arrangement is designed for connection to the on-board power supply system and can be of any suitable design. In the simplest case, it can for example be an electric conductor configuration which is formed for connection to the on-board power supply system via the connecting element and which for instance connects the on-board power supply system, if required by means of another plug-in connector, with further components or with another module. In particular, the electric arrangement comprises however one or more electric or electronic components and/or circuits.

Preferably, the electric arrangement is a power device. The definition of power device comprises in the context of the present invention all electric circuit arrangements and components that are formed for connection to the on-board power supply system or to the drive unit and particularly for supply of electric energy to the drive unit or for dissipation of electric energy generated by the drive unit. The latter can particularly then be the case when the drive unit is used as regenerative brake or as generator. Preferably, the power device is designed for the supply or for the dissipation of an electric current of at least 1 A, particularly preferred of at least 5 A, respectively.

Preferably, the electric arrangement is a voltage or current source, i.e. an energy source, and comprises for example a battery, a charging device, a solar panel, a fuel cell and/or a generator. The module can thus particularly be formed as charging device or charging station, i.e. as "charging module".

Alternatively or additionally, the electric arrangement can also be formed as electrical load, i.e. as energy drain, and comprise for example a brake resistor, a battery in charging mode, a converter or a power feed-in for the electric grid, if required with an inverter for a "vehicle-to-grid" coupling.

The provided locking means according to the invention can be of any suitable design to lock connecting element and interface with each other in a locking position, i.e. mechanically lock them with each other, so that accidental disconnection of the module from the bicycle is being avoided. Thus it is for example possible to avoid a disconnection of bicycle and module "under load" which considerably increases safety of operation. Furthermore, depending on the design, an unauthorized removal of the module from the bicycle can also be avoided, whereby a certain anti-theft protection is given.

Preferably, the locking means are designed as corresponding elements. In this context, one of the locking elements can for example be formed as groove, recess or opening in which the respective other locking means engages, which is preferably formed as pin or bolt. Particularly preferred, the second locking means is formed for positive connection to the first locking means.

The locking means can be formed in one or multiple parts, whereby the first locking means is preferably formed integrally with the interface. Preferably, the second locking means is formed integrally with the connecting element.

If the vehicle comprises multiple interfaces, preferably each of the interfaces should comprise an assigned locking means.

According to the invention, at least the first or the second locking means is movable from a free position into a locking position and vice versa. However, also both locking means can be formed movable. Preferably at least the second one, i.e. the locking means on the module side, is formed movable, whereby the interface on the vehicle side can be advantageously formed very simple and compact.

The respective locking means can for instance be formed in such a way that it is linearly movable from the free position into the locking position. Depending on the application, the respective locking means can however also be formed for several superimposed movements, for example alternatively or additionally pivotable or rotatable, whereby the locking means is preferably movable from the free position to the locking position by a lateral movement particularly easy to realize. Preferably, at least one locking means is movable in a direction, perpendicular to a direction of connection or disconnection of interface and connecting element, i.e. perpendicular to the direction in which interface or connecting element have to be moved to be engaged with each other or to disconnect the connection.

In the context of the present invention, a "free position" or "unlocking position" is understood to mean a position of the locking means that generally allows disconnecting of the connecting element from the interface. Certainly, another safety device or a fastener can be arranged at vehicle and/or module, which even in the free position prevents an independent separation of the connecting element from the interface, as for example an additional mechanical and/or magnetic locking or fixing.

In the locking position, as already discussed at the beginning, connecting element and interface are locked with each other, i.e. mechanically locked in such a way that an accidental disconnection of the module from the vehicle is being avoided. In this position, both the locking means are engaged with each other in such a way that a disconnection of connecting element and interface, i.e. a substantial movement of these components relative to each other in the disconnection direction, is blocked. The holding force of the connection between connecting element and interface by the locking means is preferred in such a way that in the locked state, pulling apart of interface from connecting element with the help of a person's bodyweight is being prevented. For this purpose, the locked connection between connecting element and interface should preferably be designed for a holding force of at least 500 N, preferred 1000 N, particularly preferred at least 2000 N, further preferred at least 4000 N and advantageously at least 6000 N.

The at least one locking means can be formed in such a way that it is manually movable between the free position and the locking position. For this purpose, the respective locking means can be formed with a suitable operating element, for example with an appropriate manually operated push-button or lever.

Preferably, the locking means is formed with a lockable operating element, as for example a lock and particularly a lock cylinder. Hereby, an increased protection against third party interferences, such as for example theft, is made possible.

Beside manual operation, the locking means can additionally or alternatively also be formed to be movable between the free position and the locking position with a motorized locking drive, as for example by means of one or more springs and/or a pneumatic, hydraulic or otherwise motorized locking drive.

Preferably, the locking means is connected to a spring arrangement to provide a restoring force. Hereby, a motorized locking drive can be formed particularly simple as only one direction of motion of the locking means, namely against the spring force, has to be motor driven.

According to a preferred embodiment, an electrically operable locking drive is arranged at the first and/or second locking means that is designed to move at least one, i.e. the first and/or the second of the locking means between the free position and the locking position.

For this purpose, the electrically operable locking drive can be of any suitable design and can for example be formed as electric motor. The locking drive can be connected directly as well as via another mechanical system, for example a worm drive or a gear wheel system, to the respective locking means, to move the respective locking means between the free position and the locking position.

The drive for the locking means can be arranged both at the electric vehicle and at the module. Provided that both locking means are formed movable, a corresponding locking drive can be arranged at each of the electric vehicle and the module.

Particularly preferred, the locking drive is arranged at the connecting element on the module side. Hereby, a particularly simple and compact interface on the vehicle side is made possible. Also therefore in case of a charging module, mechanically movable components are not arranged on the vehicle side, whereby a particularly advantageous protection against external influences such as for example moisture and mechanical damage by vibrations during operation of the vehicle is given. Furthermore, for example in case of malfunctions, the locking drive can be accessed independently from the electric vehicle to easily disconnect vehicle and module from each other in case of for example repairs and maintenance.

The activation of the locking drive can take place by any suitable devices. It is for instance conceivable to provide a switch contact that activates the locking drive when connecting the connecting element to the interface to lock the components. For example a mechanical sensor or also a contactless sensor, as for instance an acoustic or an optical sensor, can be used as switch contact.

Preferably, the module comprises a module control connected to the locking drive. The module control is hereby particularly used to set the position of the second locking means and to accordingly control the locking drive.

In this context, the module control can for instance comprise a microcontroller or another suitable electronic component, where necessary with an appropriate programming.

Thus it is for instance conceivable that in case of a charging module, the module control activates the locking drive on connection of interface to connecting element and locks the locking means. After completed charging process of the battery present in the vehicle, the locking drive is again activated and interface and connecting element are accordingly unlocked automatically. Hereby can be prevented that the charging process is interrupted early, which can be disadvantageous for conventional batteries.

Alternatively or additionally, the module control can be connected to a control panel so that locking and/or unlocking can only take place after entry of a PIN code. Thus, an unauthorized removal of a module or of the vehicle can be prevented especially in public spaces.

According to a particularly preferred embodiment of the invention, the electric vehicle further comprises a control device. The module control is configured for communication with the control device and particularly for sending at least an identification signal to the control device upon connection of the connecting element to the interface. The control device is configured in order to receive the at least one identification signal, to compare the identification signal with at least one compatibility parameter, and, in case that the identification signal corresponds to the compatibility parameter, to send a first activation signal to the at least one locking drive to lock the connecting element to the interface.

Advantageously, the interface of the electric vehicle is thus only being locked to the connecting element of the module if for example the compatibility or the eligibility for this purpose is assured. It is thus for instance possible to ensure that only compatible or eligible vehicles can be used and locked with modules, as for example a charging station, or also only compatible or eligible modules, as for example original batteries, can be used and locked with the vehicle.

The activation signal can in this context be sent to the locking drive directly by the control device or indirectly for example via the module control. The activation signal can in this context be an accordingly suitable, preferably electric signal; particularly preferred, the activation signal is a digital signal.

The control device can, for communication with the at least one module, particularly comprise one or more microprocessors or an accordingly equipped computer unit with an appropriate programming, stored in a memory.

The control device can be formed in one or multiple parts, whereby a central control device is preferred. The control device can also be formed integrally with further components of the vehicle, for example with a motor control of the electric drive unit. Preferably, the control device corresponds to an "Energybus-Controller (EBC)".

The module control can, as mentioned at the beginning, be designed in such a way that the identification signal is being sent to the control device at least upon connection of the connecting element of the module to the interface of the electric vehicle.

The communication can for example be carried out wirelessly with a suitable protocol. With a wireless communication, control unit and module control should comprise appropriate receiver or transmitter units. Not mandatory, although preferred, is in this context a bidirectional communication; whereby it is generally sufficient if the module control can send the identification signal to the control device. So it would for example be possible that the control device comprises a RFID reader, which scans the module control formed with a RFID chip at or shortly before connecting the connecting element to the interface. The module control can thus be formed active or passive, for example as transponder.

Alternatively to a wireless communication, control device and module control can also be formed for communication via an appropriate communication line; it would be for example conceivable that both control device and module control communicate with each other through the on-board power supply system and/or an auxiliary on-board supply system if present, by for instance transmitting the identification signal modulated according to a "power line communication". Preferably, the identification signal is a digital signal, which is particularly advantageous concerning the reliability.

The identification signal enables the control device to do a comparison with at least one compatibility parameter and thus a decision concerning the compatibility or eligibility for operation of the module with the vehicle. For instance, the identification signal can enable the control device to decide concerning the compatibility of the electric arrangement of the module with the on-board power supply system, i.e. a check if the arrangement can be safely connected to the on-board power supply system.

In the simplest case, the identification signal allows an identification of the module, so that, if necessary after scanning of an appropriate memory unit provided in the control device, a verification is possible if the module may be connected to the electric vehicle or if the module is compatible with the on-board power supply system and thus with the vehicle. Thus, the identification signal can correspond to an identification parameter, such as for example an access or PIN code, a serial number and/or a model ID, if required with manufacturer ID. Alternatively or additionally, the identification signal can correspond to a functional ID regarding the functionality of the electric component, such as for example "energy source" or "energy drain", or "battery", "charging device" or "solar panel".

The at least one compatibility parameter can for example comprise one or more reference values and/or one or more threshold values. Certainly, the control device can be formed for comparison of several compatibility parameters. The at least one compatibility parameter can be preset in the control device or preferably be obtained from a memory unit by means of the control device. Alternatively or additionally, a measuring unit can be connected to the control unit, to measure an electric variable of the on-board power supply system, as for example voltage or current flow, and to detect accordingly one or more compatibility parameters out of it.

Preferably, after occurred compatibility check, thus in case that the identification signal corresponds to the compatibility parameter, the control device sends a second activation signal to at least one switch unit to connect the electric arrangement to the on-board power supply system.

The switch unit provides a switchable, separable connection of the electric arrangement of the module to the on-board power supply system. Generally, the switch unit should be formed in such a way that before activation of the switch unit by the control device, the electric arrangement is safely disconnected from the on-board power supply system, hence also in the period between the connecting of the connecting element to the interface and the activation of the switch unit by the control device.

The present design thus provides a safe disconnection of the electric arrangement of the module from the on-board power supply system before the compatibility check. In case that the identification signal corresponds to the compatibility parameter, the previously described locking of interface and connecting element by sending the first activation signal can for example take place at first, and then the electrical connection between on-board power supply system and electric arrangement of the module is established. Consequently, the safety of operation is further increased due to initially ensuring the correct connection and locking of the module at the vehicle, before the electrical connection between on-board power supply system and electric arrangement of the module is being established.

Preferably, the control device is hence formed to initially send the first activation signal to the locking drive and then send the second activation signal to the switch unit.

For operation of the switch unit, the switch unit is suitably connected to the control device for reception of the second activation signal, whereby besides a direct connection certainly also an indirect connection, for example via further components of the vehicle or the module, is possible.

The switch unit can be formed for single-pole or multi-pole switching of the connection between the electric arrangement and on-board power supply system, as long as it is assured that before activation by the control device, no significant electric current flows between the arrangement and the on-board power supply system. Preferably, the switch unit is formed for all-pole switching of the connection between electric arrangement and on-board power supply system, which further advantageously increases the safety of operation. The switch unit can be formed discrete, for example as relay or contactor, but also as integrated circuit, for example as MOSFET.

In this context, the switch unit can be formed in one or multiple parts and generally be arranged in the vehicle, which is advantageous concerning weight and overall size of the module. Preferably, the switch unit is however provided in the at least one module. Hereby, the on-board power supply system can be extended in a simple way by addition of further interfaces, similarly to a bus system. In case of multiple modules, each module certainly should comprise an appropriate switch unit.

Preferably, the switch unit is formed integrally with the connecting element, whereby a particularly compact design is provided. Particularly preferred, the module control is formed integrally with the connecting element and in particular integrally with the switch unit. Advantageously, an optical indicator, such as for example a LED, is connected to the switch unit for display of the connection state.

According to a preferred embodiment of the invention, the control device can be designed to detect at least one electric operating parameter of the arrangement from the identification signal and to compare the operating parameter with at least one electric compatibility parameter of the on-board power supply system.

Hereby, an advantageous compatibility check based on the electrical properties of the systems to be connected is made possible, which further increases the safety of the system. The electric operating parameter of the arrangement and the electric compatibility parameter of the on-board power supply system can in this context be any electric variable or range suitable for the comparison, such as for example voltage, current, power and/or battery capacity.

Certainly, it can be provided to compare several electric operating parameters of the arrangement with corresponding compatibility parameters.

The module control can for example be formed to retrieve the at least one electric operating parameter from a memory on the module side and to subsequently send a corresponding identification signal to the control unit of the vehicle. This is particularly then advantageous when the electric operating parameter corresponds to an operating range of the electric arrangement of the module, for instance to the applicable voltage range and/or a maximum applicable current of the arrangement.

Alternatively or additionally, the module control can comprise at least one measuring unit each, to detect the electric operating parameter by measuring. In case of a voltage source, such as a battery or a charging device, it is thus possible to determine the present voltage and to send a corresponding identification signal to the control device.

Similarly, the control device can, as discussed in the preceding, determine the at least one electric compatibility parameter of the on-board power supply system from the memory unit or a measuring unit provided in the vehicle.

Particularly preferred, the module control comprises at least one measuring unit for measuring the voltage of the electric arrangement as well as the control device comprises a measuring unit on the vehicle side for measuring the voltage of the on-board power supply system. Advantageously, the module control can comprise a second measuring unit to determine whether the on-board power supply system shows a voltage after the connection with one of the interfaces.

Preferably, the module control transmits the identification signal, which corresponds at least to the voltage of the electric arrangement. The control device detects the voltage of the electric arrangement from the identification signal and compares the voltage of the electric arrangement to the voltage of the on-board power supply system. The control device sends in this case the activation signal to the switch unit if the two voltages do not substantially differ from each other, i.e. preferably by not more than ±0.5 V, particularly not more than ±0.15 V and particularly preferred not more than ±0.05 V.

Certainly, depending on the application, it is not excluded that the identification signal corresponds to multiple operating parameters and/or identification parameters and that the control device is formed with corresponding compatibility parameters for comparison of these operating and/or identification parameters.

In a particularly preferred embodiment, the control device is further formed for sending a deactivation signal to the at least one locking drive to unlock the connecting element and the interface.

For this purpose, the control device can for example be connected to an appropriate control panel, so that the deactivation signal can be sent according to a user input, for example when the user requests the disconnection of the module from the vehicle. Alternatively or additionally, the control device can be formed to automatically send the deactivation signal, for example in case of the connection of a charging module when the charging process is completed.

According to a preferred embodiment of the invention, the interface and/or the connecting element is formed as plug-in connector. Preferably, both interface and connecting element are formed as correspondingly formed plug-in connectors.

In the context of the present invention, a plug-in connector is understood to mean a separable component, which is to connect as easy as possible to a corresponding component and which allows an electrical connection of the vehicle to the module in the connected state.

The plug-in connector should preferably be formed in such a way that a safe connection between on-board power supply system of the vehicle and the electric arrangement of the module is possible. Particularly, the plug-in connector should be adapted to the electric requirements of the respective arrangement, particularly concerning current and voltage. Advantageously, the plug-in connector is designed for an electric current of at least 3 A, particularly at least 5 A at a voltage of 10 V-100 V, in particular 12 V-48 V.

Conventional plug-in connectors are for instance receptacles that are designed as sockets for plugs. It is possible in this context to design the connecting element or the interface as receptacle or plug. Advantageously, as particularly low-maintenance and easy-care, the connecting element on the module side is designed as receptacle. In this case, the interface can be formed as plug corresponding to the receptacle.

Preferably, the plug-in connector comprises at least two electric contacts, so that the on-board power supply system can be connected to the electric arrangement. Particularly preferred, the plug-in connector further comprises contacts for the transmission of a communication signal, as for example of a CAN bus system. Advantageously, the plug-in connector is alternatively or additionally formed for electrical connection of the auxiliary on-board supply system, discussed in the preceding, to the module.

According to a particularly preferred embodiment of the invention, a flexible connection means is arranged between the interface and the electric vehicle and/or the connecting element and the module. Hereby, the operability of the vehicle system is further simplified and a connection of the module to the vehicle is further facilitated.

In this context, the connection means can be formed in one or multiple parts. Preferably, the connection means is built tubular or cable-like and comprises, besides appropriate electric conductors for connecting of the on-board power supply system with the electric arrangement of the module, a retaining element made of a material resisting mechanical stress, as for example a metallic armor or a steel rope.

By the use of the flexible connection means, enhanced connection options between module and electric vehicle result for the vehicle user. For example, bicycles can be parked in a spaced manner at a charging station and be connected to and locked with this charging station. It is also for example possible to connect and to lock modules with the vehicle, whereby the modules however can be flexibly positioned, for example at the handle bar of the vehicle. Furthermore, the vehicle can, for instance with the connection means, be attached particularly easy to an object, as for example a bicycle rack, and additionally be connected to the module.

Particularly preferred is an embodiment where an additional receptacle with a locking means for the interface is present on the vehicle, so that the flexible connection means with the interface can be inserted into and locked with the receptacle. Hereby, use of the interface with the flexible connection means also as "cable lock" is possible.

According to a particularly preferred embodiment of the invention, the first or second locking means is formed as locking bolt. The exact design of the bolt should be chosen depending on the application; the bolt can for instance be formed cylindrical or alternatively also spherical. The bolt can comprise additional recesses or protrusions as for example one or more grooves. Locking bolts are particularly easy to manufacture, low-maintenance and particularly easy to combine with the preferred embodiment of a linearly movable locking means. Preferably, the respective other locking means is formed as receptacle for the locking bolt, so that a safe connection of module and vehicle is possible.

According to another preferred embodiment, a magnetic fixing is provided to fix in place and to loosely position the interface and the connecting element with each other. The magnetic fixing can be arranged both at the connecting element and/or at the interface. The fixing allows an exact positioning of the interface and the connecting element in relation to each other, to allow a failure-free and exact locking. Furthermore, hereby the connecting element stays at the interface also after unlocking occurred, so that the connecting element, for example when formed with a flexible connection means, does not leave its position uncontrolled and gets accidentally damaged.

Preferably, the electric vehicle is formed for connection of two or more modules. Especially here, distinct advantages result from the compatibility check. Certainly, the electric vehicle should preferably comprise two or more interfaces.

The switch unit can in this case be formed for separate connecting of the two or more modules to the on-board power supply system so that in case of an incompatibility, the corresponding module will in fact not be connected to the on-board power supply system, however a connection of the other modules is possible.

Alternatively or additionally, the control unit can preferably comprise a priority control in case of connection of two or more modules, to in addition to the compatibility check, determine based on the priority if the respective module can be connected to the on-board power supply system. To this end, the control unit can preferably be adapted to compare the identification signal with one or more priority parameters, so that the activation signal is only being sent to the switch unit if the identification signal corresponds to the at least one priority parameter.

For example in case of a connection of multiple battery modules, it is conceivable to prioritize based on the present power requirement of the electric drive unit. Likewise it is possible to provide prioritization based on the module type, so that for example at first the energy of a solar panel is being used for the drive, and a battery module is only then being connected when the solar panel does not supply sufficient electric power. Certainly, also a module that is not connected can nevertheless be locked with the vehicle.

Further, the electric vehicle can comprise a communications network, separate from the on-board power supply system, that connects the control device to the at least one interface. The communications network here is used for transmission of at least the identification signal from the module control, after the module has been connected to the interface of the vehicle. Certainly, the communications network can be formed for connection of other components of the vehicle or the module, such as for example of the locking drive, the switch unit, an instrument board, an operating device and/or a motor control. The communications network may in this context for example comprise electric signal lines; preferably, the communication network is an optical network, i.e. a communications network accordingly formed with optical signal lines and transmitter/receiver arrangements. Preferably, the communications network is formed as bus system, in particular preferred the communications network is a CAN bus system. Particularly preferred, control unit and module control are formed for communication via the CAN-open protocol.

Preferably, interface and/or connecting element are formed to connect the electric arrangement to the on-board power supply system and the module control to the communications network. The connecting element consequently allows the transmission of electric energy for the drive unit and also a separate transmission of the identification signal or activation signal. Hereby, the usability is advantageously further increased, as only one connection has to be established upon connection of the module to the vehicle.

Particularly preferred, interface and/or connecting element are further formed for connection of the module control to the eventually provided auxiliary on-board supply system, to supply the module control with electric energy. Particularly preferred, interface and/or connecting element are formed for connection of a 42 V on-board power supply system, a 12 V auxiliary on-board supply system and a CAN bus system (CAN high, CAN low).

According to another aspect of the present invention, a method is provided for connecting an electric vehicle, particularly a light electric vehicle, to a module, wherein the electric vehicle comprises at least an on-board power supply system, an interface connected to the on-board power supply system and a first locking means arranged at the interface, and the module comprises at least one connecting element separably connectable to the interface and a second locking means, arranged at the connecting element, which is formed for engagement with the first locking means. In this context, the first and/or the second locking means is moved from a free position into a locking position to lock the connecting element at the interface.

The previously explained locking between an electric vehicle and a module can also be used advantageously in the context of a modular charging system. Another aspect of the present invention thus concerns a modular charging system with a charging unit and at least one module.

The charging unit comprises a charging line and one or more interfaces connected to the charging line for connection of at least one rechargeable module. Further, the charging line comprises a first locking means arranged at the interface.

The at least one rechargeable module comprises a connecting element separably connectable to the interface and an electric arrangement for connection to the charging line. A second locking means is arranged at the connecting element and is formed for engagement with the first locking means.

In this context, at least one of the locking means is movable between a free position and a locking position, wherein the connecting element is separable from the interface in the free position and in the locking position the connecting element is mechanically locked with the interface.

The embodiment according to the present aspect thus also allows an advantageously increased safety of operation when connecting a rechargeable module to a charging unit by means of the locking according to invention for protection of for example unauthorized removal of the rechargeable module.

The electric arrangement preferably comprises an electric energy storage and particularly preferred a battery arrangement, such as for example one or more accumulators. Preferably, the rechargeable module is thus a battery module.

The charging unit is preferably configured for connection to a power grid, for example a 220V or 110V electric power grid. Preferably, the charging unit comprises a power supply unit that connects the power grid to the charging line and is designed for an adaptation and monitoring, if necessary, of current and/or voltage. The charging line in this context can further be formed according to the previously described on-board power supply system.

Concerning the configuration of the individual components of the charging unit and of the rechargeable module, reference is made to the preceding description of the modular vehicle system, wherein the configuration of the components of the charging unit corresponds to the respective components of the vehicle.

The invention is described in the following based on embodiments.

BRIEF DESCRIPTION OF THE DRAWINGS

It is shown in.

DETAILED DESCRIPTION OF PREFERRED EMBODIMENTS

Figure 1:
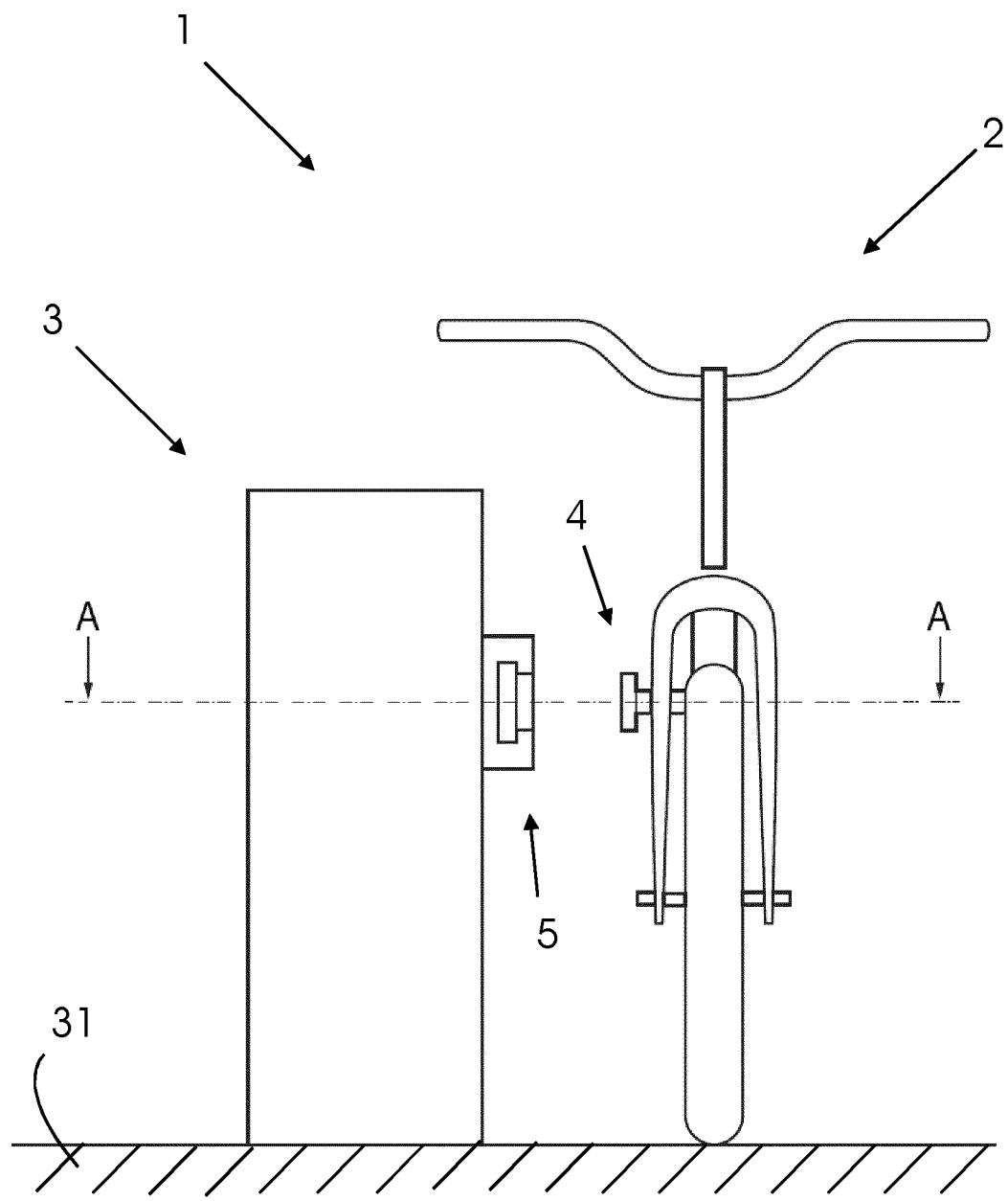
FIG. 1 an embodiment of a modular vehicle system with an electric bicycle and a module in a schematic view.

FIG. 1 shows an embodiment of a modular vehicle system 1 in a schematic view consisting of an electric vehicle 2, in the present case an electric bicycle, and a module in form of a charging module, namely a charging column 3. The module formed as charging column 3 is in the present case designed for permanent connection with the ground 31, for example in an outdoor area, and can thus for example be used as public charging terminal in urban environments.

The vehicle 2 comprises an interface 4 formed as plug-in connector that can be connected to the charging column 3 to hence charge for example a battery arranged on the bicycle side (not shown) via the charging column 3. For this purpose, the vehicle 2 comprises an on-board power supply system 13 (cf. FIG. 2) which connects at least the interface 4 to the battery and an electric drive unit (not shown) in the vehicle. The on-board power supply system 13 is according to the present embodiment a direct current system with an operating voltage of 42 V DC. Interface 4 and on-board power supply system 13 are designed for a current of approx. 20 A-100 A.

For connection of the vehicle 2 with the charging column 3, the vehicle is being moved in such way relative to the charging column 3 that the interface 4 is engaged with a tapered formed receptacle 5 for the interface 4, which is described with reference to the following FIGS. 2-3.

Figure 2:
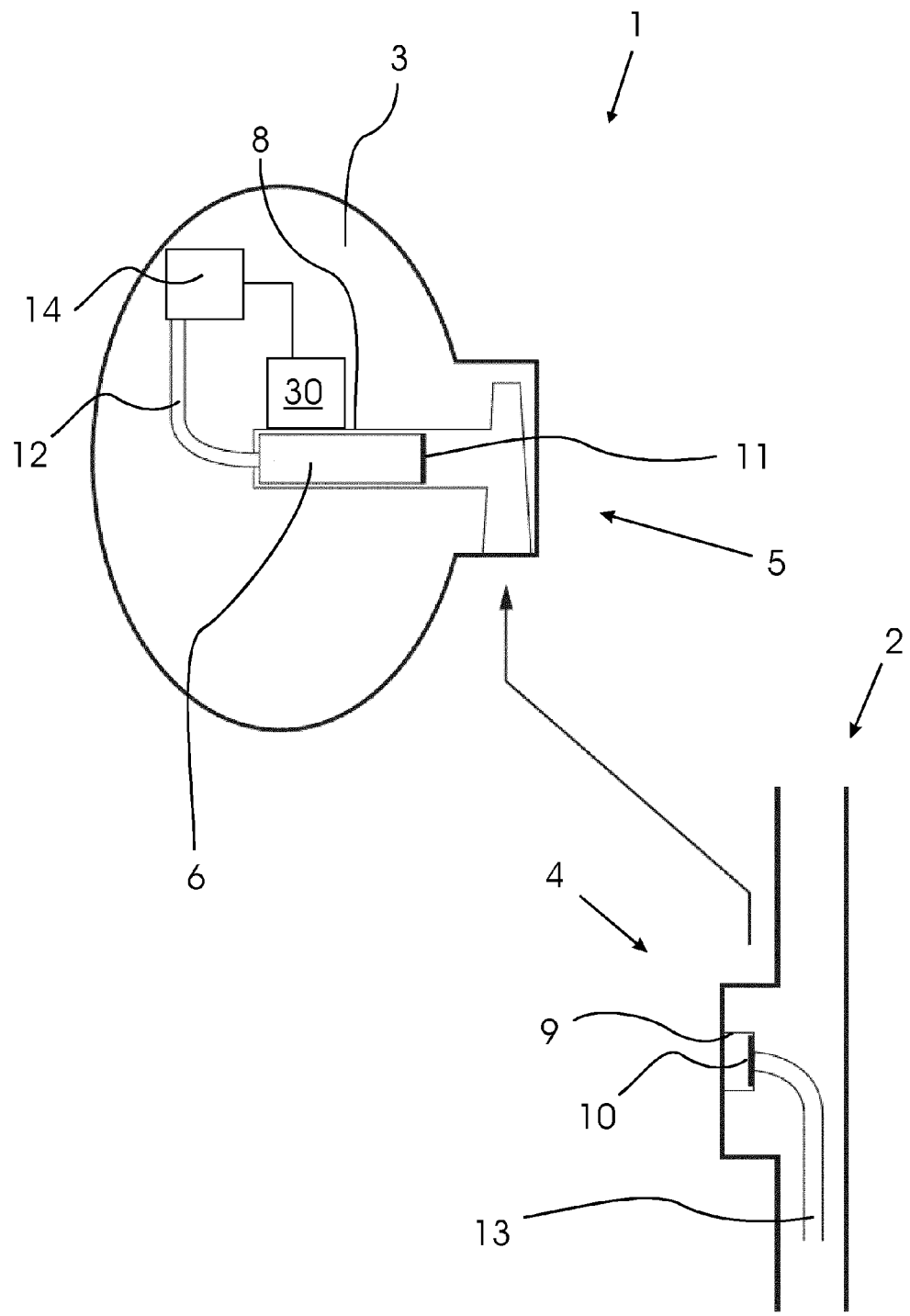
FIG. 2 a partial horizontal sectional view of the embodiment from FIG. 1.

FIG. 2 shows a schematic, horizontal sectional view of the modular vehicle system 1 according to FIG. 1 along the line A-A, wherein the vehicle 2 in FIG. 2 is only partially shown. As shown, the charging column 3 comprises an oval basic shape, wherein the receptacle 5 (see also FIG. 1) is arranged sidewise for connection to the vehicle 2.

The receptacle 5 is connected to a sliding guide 8 in which a connecting element 6 is arranged linearly movable. The connecting element 6 is used for connection of an electric arrangement, i.e. in the present case a charging control 14, to the vehicle 2 and is formed as cylindrical plug-in connector. The charging control 14 is used in the present case for supply of an electric charging current of approx. 20 A as well as for control of the charging process, and thus comprises a microcontroller with an appropriate programming. The connecting element 6 is being driven by an electric motor 30 that is connected to the charging control 14 for control.

On the front side of the connecting element 6, a second contact element 11 is arranged which is formed correspondingly to a first contact element 10, arranged at the electric vehicle 2, to establish an electrical connection between vehicle 2 and charging control 14. Furthermore, the second contact element 11 of the connecting element 6 also serves in the present case as first locking means for locking of the module 3 with the vehicle 2, as explained in the following. The charging control on the module side 14 is connected to the connecting element 6 and thus to the second contact element 11 by means of a flexible connection cable 12.

The interface on the vehicle side 4 shown in a sectional view in FIG. 2 comprises, as already discussed at the beginning, the first contact element 10. This contact element is, as shown, arranged in a blind hole-like recess 9 that engages with the contact element 11 on the module side and thus acts as locking means.

For connection of the vehicle 2 to the charging column 3, the interface 4 is being slid in direction of the arrow according to FIG. 2 into the tapered receptacle 5. As shown in FIG. 2, the connecting element 6 is in a free position, so that the interface can be slid into the receptacle 5.

As soon as the interface 4 has reached its end position in the receptacle 5, the charging control 14 activates the electric motor 30 and hence operates the connecting element 6. For this purpose, a micro switch is provided at the receptacle 5 (not shown), which signalizes to the charging control 14 a vehicle 2 to be connected to the charging column 3. As an alternative to the micro switch, also an optical sensor or a Hall sensor can be used.

Figure 3:
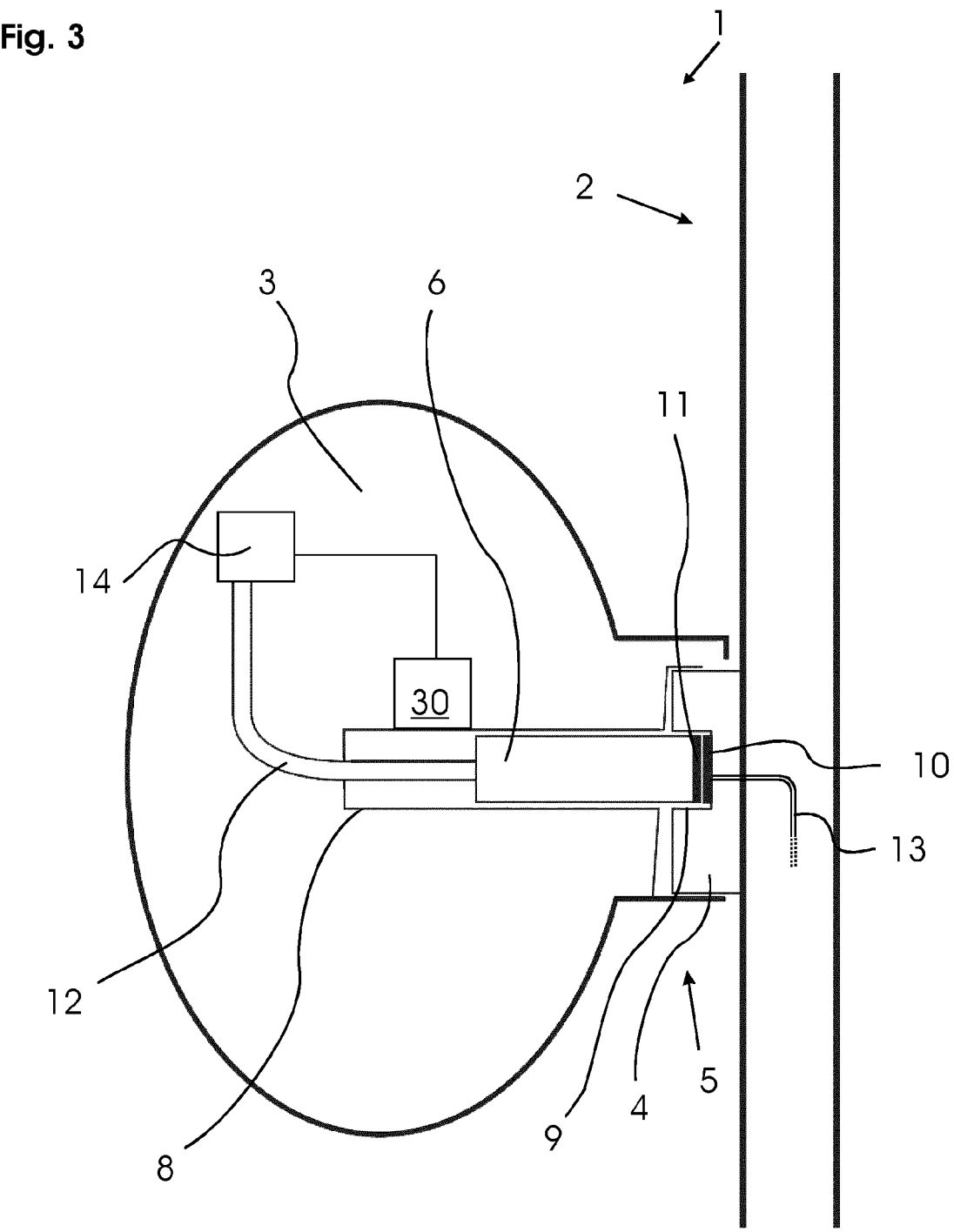
FIG. 3 a partial horizontal sectional view of the embodiment from FIG. 1 in the connected and locked state.

The connecting element 6 is being accordingly brought into a locking position, which is shown in another schematic sectional view in FIG. 3.

The electric vehicle 2 is here, as shown in FIG. 3, slid into the receptacle 5 with the interface 4. The connecting element 6 is in the locking position, in which the first contact element 10 is connected to the second contact element 11 and so establishes an electrical connection between charging control 14 and the on-board power supply system 13. Furthermore, the second contact element 11 on the module side is engaged with the recess on the vehicle side 9 whereby vehicle 2 and charging column 3 are mechanically locked, i.e. the vehicle 2 is protected against unauthorized removal or theft at the stationary charging column 3. Hence, at the same time is advantageously provided both an electrical connection and a mechanical locking.

To unlock vehicle 2 and charging column 3, the charging control 14 activates the electric motor 30 again. For this purpose, for example an operating element (not shown) can be provided at the charging column 3, so that an unlocking only takes place after entry of a predefined PIN code by the user. Especially if the present charging column 3 is placed in the public space, such a protection can be appropriate.

The contact elements 10, 11 can additionally be designed for establishing a data communication between the vehicle 2 and the charging column 3. Preferably, the contact elements 10, 11 are formed as plug and socket with 2-6 electric contacts each.

Figure 4:
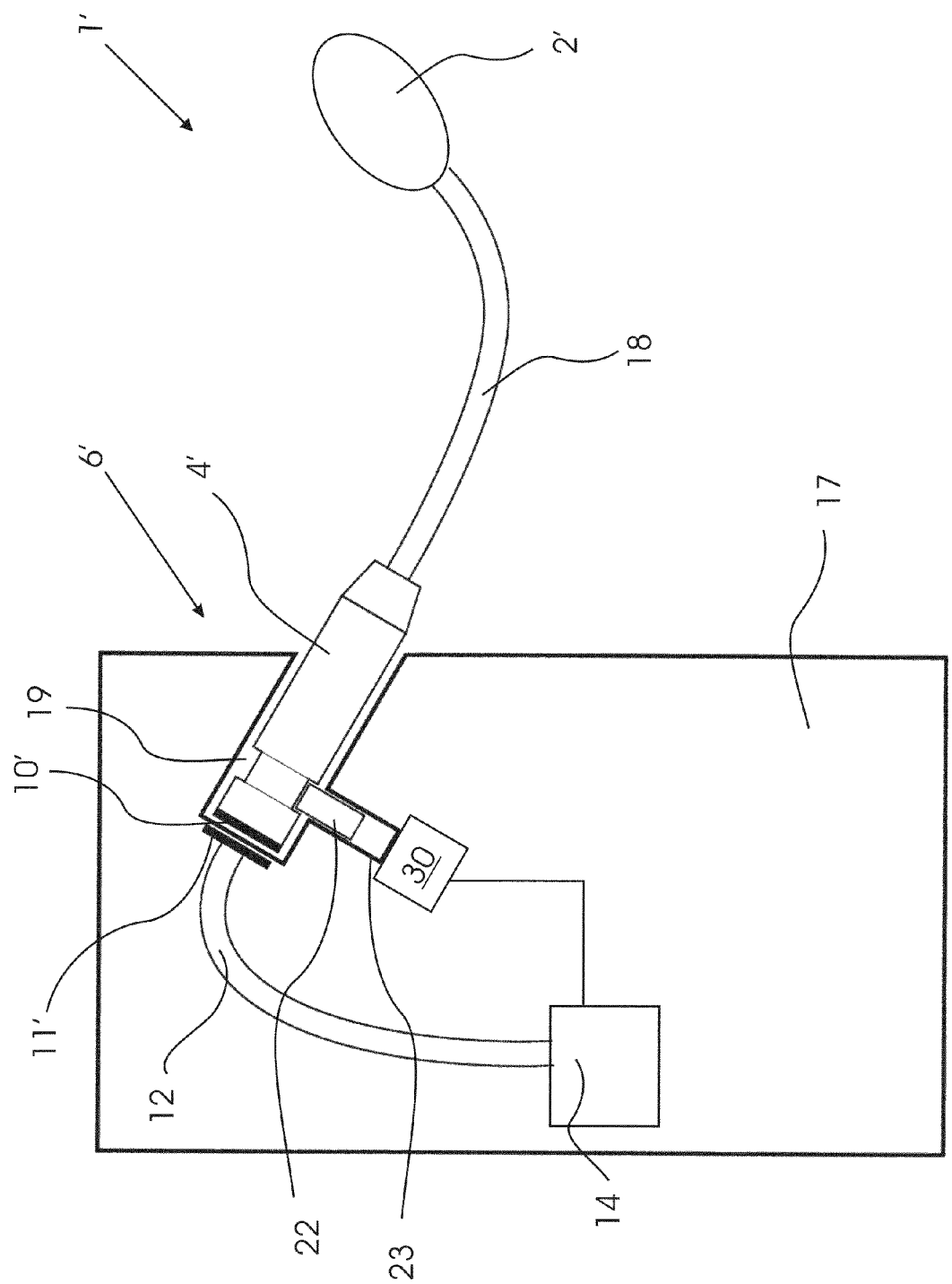
FIG. 4 a schematic view of a second embodiment of a modular vehicle system in the locked state.

FIG. 4 shows a second embodiment of a modular vehicle system 1' in a schematic view based on the connection of an electric vehicle 2' to another module, in the present case a charging device 17. For reasons of clarity, the vehicle 2' is only shown adumbrated in FIG. 4. The present embodiment corresponds to a large extent to the embodiment explained with reference to the FIGS. 1-3, therefore accordingly corresponding elements are labeled with the same reference numerals.

As can be taken from FIG. 4, also in the present case the interface 4' is formed as plug-in connector. The interface 4' is connected to the on-board power supply system (not shown in FIG. 4) of the vehicle 1 by means of a suitable cable 18. The cable 18 is integrally provided with a metallic armor or a steel cable to prevent an unauthorized interference.

The charging device 17 comprises a connecting element 6' formed as socket, in which the plug-shaped interface 4' can be plugged in as shown. The interface 4' is formed as cylinder-shaped bolt and comprises a circular formed groove 19 that engages with a bar 22 for locking of vehicle 2' and charging device 17, which is shown in FIG. 4.

As previously explained with reference to the FIG. 1-3, the interface 4' comprises a first contact element 10' and the connecting element 6' comprises a second contact element 11', to electrically connect the on-board power supply system (not shown in FIG. 4) to the charging control 14.

Furthermore, a bolt shaped bar 22 is arranged at the connecting element 6'. The bar 22 is linearly movable in a sliding guide 23 by means of an electric motor 30. In the shown locking position, the bar 22 engages with the circular groove 19 of the interface 4' and prevents an unplugging or releasing of the interface 4' from the connecting element 6'.

The connecting of vehicle 2' with the charging device 17 is conducted as explained with reference to the FIGS. 1-3. In the starting position, the bar 22 is in a free position (not shown in FIG. 4), in which the interface 4' can be plugged in the socket-shaped connecting element 6'. The charging control 14 identifies the plugged-in interface 4' and operates the electric motor 30 which slides the bar 22 into the locking position shown in FIG. 4. The vehicle 2' is thus electrically connected to the charging device 17 and also mechanically locked with the device.

Figure 5A:
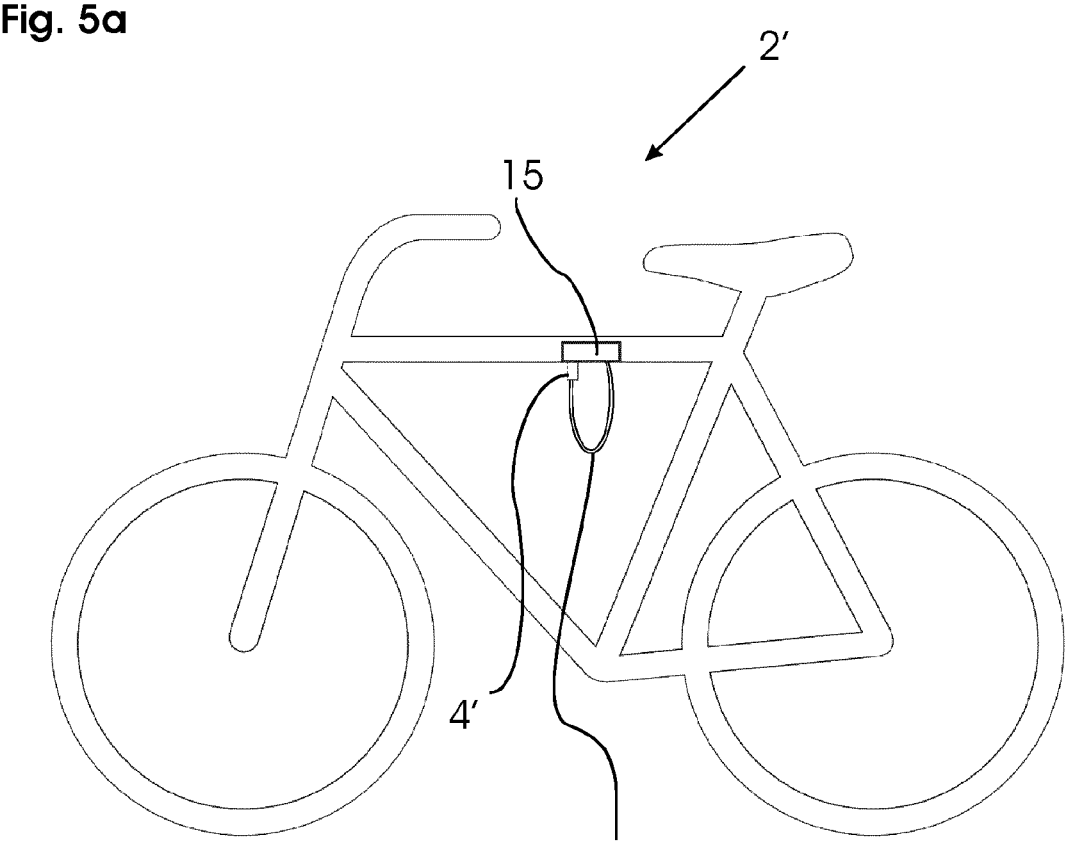
FIGS. 5a and 5b an embodiment of an electric vehicle for application in the modular vehicle system according to FIG. 4.
Figure 5B:
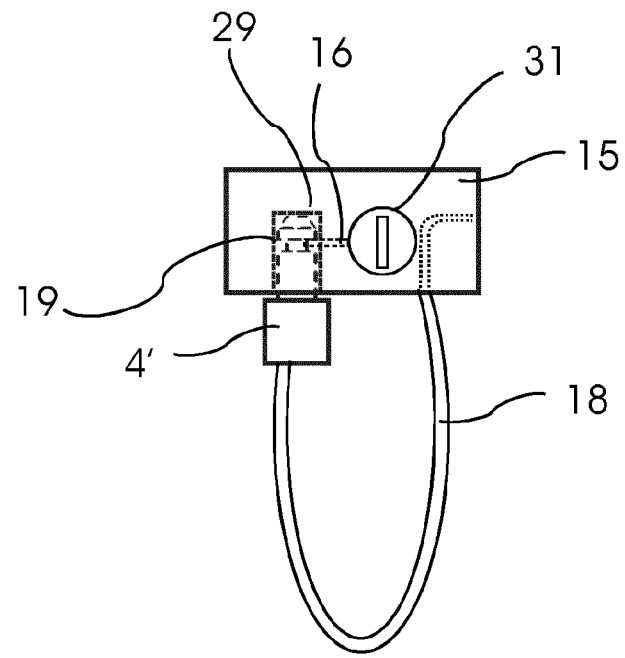

If the vehicle 2' is not connected to an according module, such as a charging device 17, the interface 4' can be fastened at the vehicle 2' in an additional holding device 15, as shown in the schematic illustrations of the FIGS. 5a and 5b.

As shown in the FIG. 5b, the interface 4' is plugged in into a socket-shaped receptacle 29. Further arranged at the holding device 15 is a locking bolt 16 that can be slid in and out of the circular groove 19 by means of a rotation cylinder lock 31.

After unlocking of the locking bolt 16 by means of the shown rotation cylinder lock 31, the interface 4' can be pulled out of the receptacle 29. Via the flexible connection means 18, the interface 4' can be connected and locked in a particularly easy way, for example with a connecting element of a module (not shown here), as previously explained. Additionally, the arrangement of interface 4' and cable 18, due to the arrangement of the holding device 15 at the vehicle 2', can be used for locking the electric bicycle 2' for instance to a bicycle rack or a lamppost.

The preceding explained embodiments of the modular vehicle system can additionally be used in combination with a compatibility check, as explained in the following with reference to the FIG. 6-10.

Figure 6:
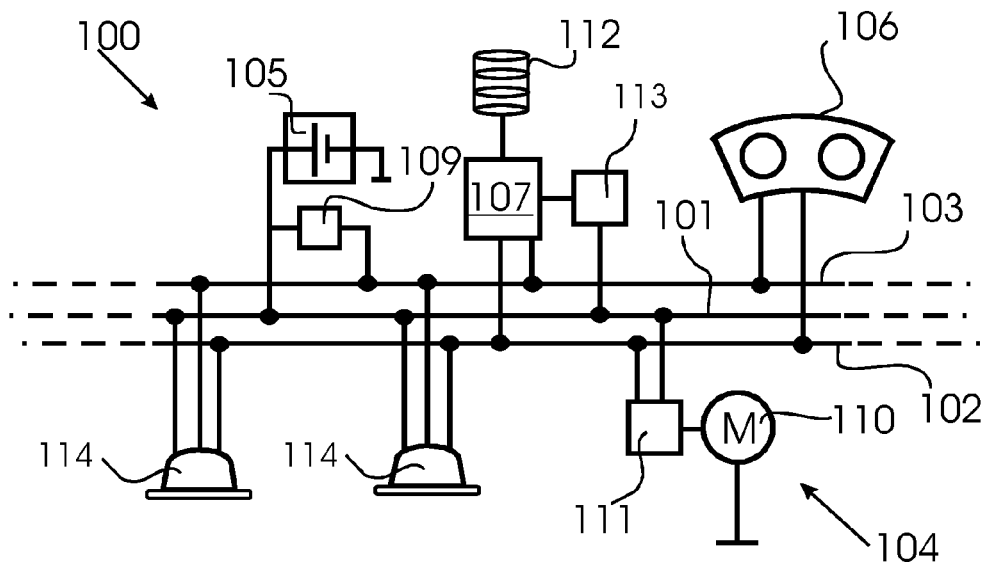
FIG. 6 an embodiment of an electric system of an electric vehicle in a schematic view.

FIG. 6 shows the electric system 100 of a modular vehicle system 1, in the present case an electric bicycle, in a schematic view. For reasons of clarity, the other particularly mechanical components of the electric bicycle, such as for example the frame and the wheels, are not shown here. Furthermore, all components are only shown schematically with regard to their mechanical embodiment to show that the compatibility check explained in the following can be applied advantageously with all previously explained embodiments.

As can be understood from FIG. 6, the electric system 100 comprises three on-board network systems in total, namely an on-board power supply system 101, a CAN bus system 102 and an auxiliary on-board supply system 103. The on-board power supply system 101 is being primarily used for electrical energy supply of an electric drive unit 104 of the vehicle. The on-board power supply system 101 is designed as a direct current system with an operating voltage of 42 V DC for a current of approx. 20 A-100 A. The on-board power supply system 101 is being supplied with electrical energy by an internal rechargeable vehicle battery 105.

The auxiliary on-board supply system 103 is designed for an operating voltage of 12 V direct current and is being used for electrical energy supply of other vehicle components, such as for example an operating unit 106 and a control device 107. In this context, the auxiliary on-board supply system 103 is being supplied with electrical energy by the battery 105 and an intermediate 42V/12V converter 109.

The CAN bus system 102 is being used for the control and the communication of the vehicle components, as described in the following. The CAN bus system 102 is formed with electrical signal lines in the present case; the communications protocol corresponds to the "CAN-open" protocol according to specification CiA 454 (LEV).

The electric drive unit 104 comprises an electric motor 110, which is connected to the on-board power supply system 101 by a motor control 111. The motor control 111 is further connected to the CAN bus 102 for reception of control commands and modulates the voltage supplied to the motor from the on-board power supply system 101 by means of pulse width modulation (PWM) to allow a control of the drive power.

For control of the electric vehicle, the already mentioned central control device 107 is provided which is accordingly connected to the CAN bus 102 and for voltage supply further to the auxiliary on-board supply system 103. The control device 107 is a microprocessor control, which is being controlled by a program stored in a connected and variable memory unit 112. In this context, the control unit 107 is being used for instance for controlling the motor control 111 for driving operation according to a control command of the vehicle user entered via the operating unit 106.

The control device 107 further monitors the on-board power supply system 101 and is for this purpose connected to a measuring unit 113 which detects voltage and current on the on-board power supply system and provides according digital measuring values to the control device 107. The memory unit 112 comprises compatibility parameters in a database, which is specified in the following.

The electric system 100 of the electric vehicle furthermore comprises two interfaces 114, which are formed as plug-in connectors for connection to corresponding modules 120 and which separably connect the on-board power supply system 101, the auxiliary on-board supply system 103 and the communications network 102 accordingly to the modules 120 connected to the interfaces 114.

The electric system 100 of the electric vehicle and in particular the on-board systems 101, 102 and 103 can certainly comprise or connect other assembly parts and components, as implied by the broken lines.

Figure 7:
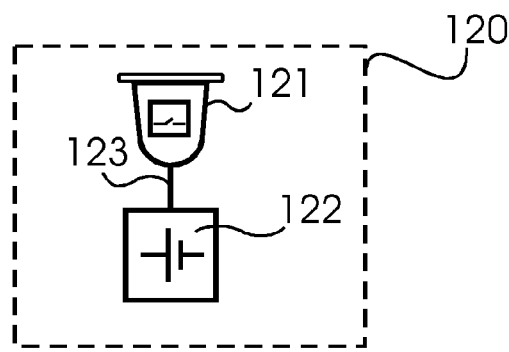
FIG. 7 an embodiment of a module in a schematic view.

An embodiment of a module 120 provided for connection to an interface 114 is shown in a schematic view in FIG. 7. The module 120 comprises a connecting element 121 that is in the present case formed as a socket for engagement with one of the interfaces 114.

The module 120 further comprises an electric arrangement, namely a 42V battery 122, which is connected to the connecting element 121 by a supply line 123 for the supply of electrical energy to the on-board power supply system

101. Alternatively, the module 120 can be formed in particular as charging column 3 or charging device 17, as shown in FIG. 2-4.

Interface 114 and connecting element 121 can correspond mechanically for example to the embodiments previously explained with reference to the FIGS. 1-4. Particularly the connecting element 121 can comprise an electromotive driven bar (not shown in FIG. 7) that engages in a circular groove (not shown in FIG. 7) arranged in the interface 114 for locking.

Figure 8:
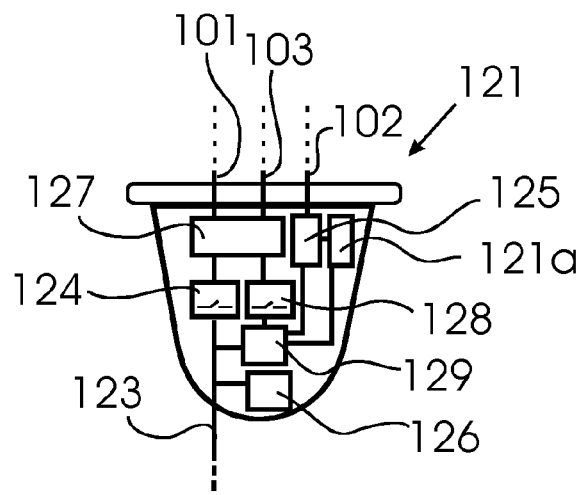
FIG. 8 a detailed view of a connecting element of the module according to FIG. 7.

A schematic view of the connecting element 121 is shown in FIG. 8. As can be understood from FIG. 8, the connecting element 121 comprises three contact elements in total to connect the module 120 to the on-board power supply system 101, to the CAN bus system 102 and to the auxiliary on-board supply system 103.

The connecting element 121 is integrally formed with a first switch unit 124, with which the connection between the supply line 123 and consequently the battery 122 with the on-board power supply system 101 can be controlled. Additionally the switch unit 128 connects a 42V/12V converter switchably to the auxiliary on-board supply system 103, to supply the electric auxiliary on-board supply system 103 of the vehicle with electrical energy, for example in case of a malfunction. The switch units 124 and 128 are in the present case formed with MOSFET switches and are being controlled by a microprocessor module control 125 that is connected to the CAN bus system 102. The module control 125 is supplied with electrical energy via the converter 129 and thus by means of the battery 122 of the module 120.

A measuring sensor 126 is provided to detect the voltage on the supply line 123 and thus the voltage provided by the battery 122, and to provide an according measuring value to the module control 125.

Further a monitoring unit 127 is provided which monitors the maximum admissible current between module 120 and on-board power supply system 101 as well as between module 120 and auxiliary on-board supply system as well as the maximum admissible voltages, so that for example the battery 122 can be safely disconnected from the electric system 100 of the vehicle in case of a short circuit. For this purpose, the monitoring unit 127 transmits corresponding measuring values on a regular basis to the module control 125, which accordingly operates the switch units 124 and 128.

In the present embodiment, a current of 100 A between supply line 123 and on-board power supply system 101 or of 20 A between converter 129 and auxiliary on-board supply system 103 should not be exceeded.

The monitoring unit 127, the switch units 124, 128 and the measuring sensor 126 are certainly connected to the module control 125 by suitable communications lines (not shown).

In addition, an electric motor 121a is provided that drives the previously described bar (not shown). The electric motor 121a is being activated by the module control 125 and is being supplied with electrical energy by the converter 129.

Figure 9:
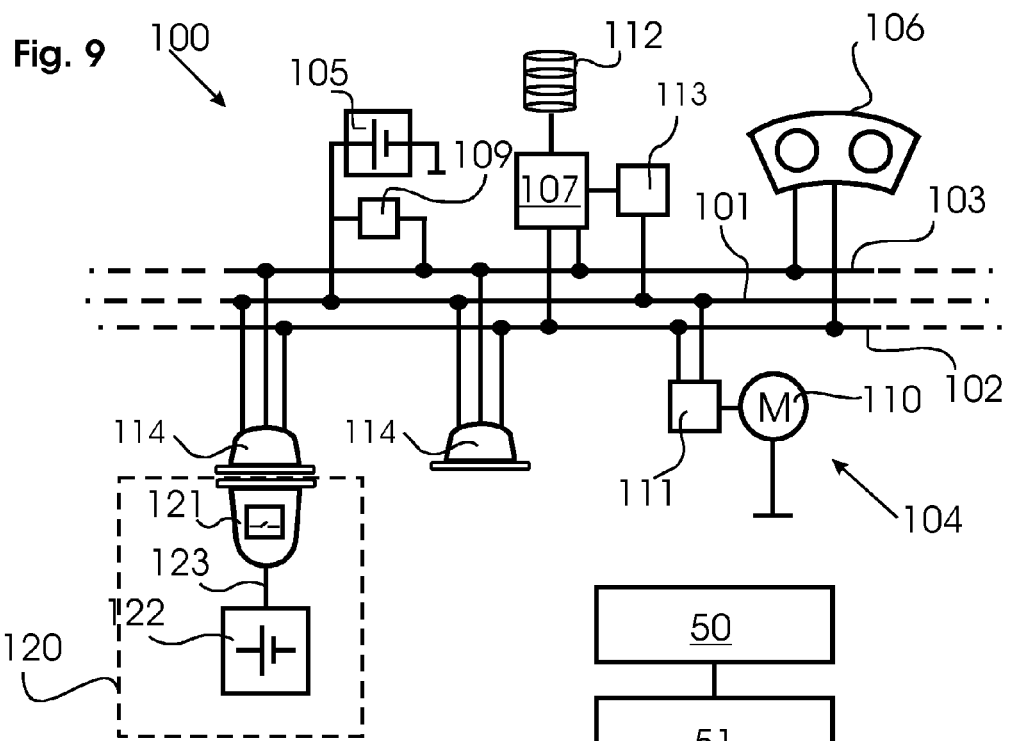
FIG. 9 the embodiment of the electric system according to FIG. 6 with a connected module according to FIG. 7 and FIG. 10 an embodiment of the communication upon connection of a module with an electric vehicle in a schematic flowchart.

An embodiment of the electric system 100 of the modular vehicle with connected module 120 is shown in FIG. 9. The connection of an additional battery 122 can for instance then be necessary when the internal vehicle battery 105 is depleted or the range of the vehicle is to be increased. For this purpose, the user connects the module 120 to the interface 114, whereupon control device 107 and module control 125 communicate with each other in a compatibility mode via the CAN bus 102, to on the one hand to check the authorization for the connection of the module 120 and on the other hand to check the compatibility of the module 120 and more specific of the battery 122 of the module 120 before connecting and a locking of the battery with the on-board power supply system 101.

Figure 10:
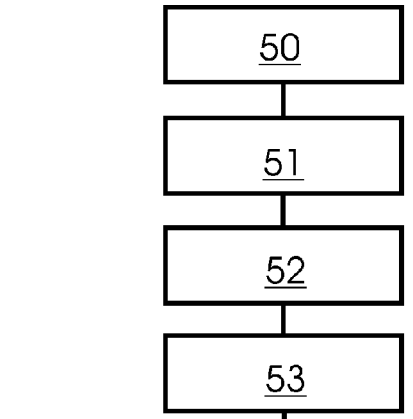

The method of connecting the module 120 to the interface 114 is explained in the following with reference to the embodiment according to FIG. 10, which illustrates the individual steps by means of a flowchart.

According to step 50, the connecting element 121 of the module 120 is at first being connected to one of the interfaces 114 by a user, as shown in FIG. 9. The switch units 124 and 128 are in this state at first open, so that the battery 122 is not connected to the on-board power supply system 101. However, the connecting element 121 provides a connection of the monitoring unit 127 to the auxiliary on-board supply system 103 and the on-board power supply system 101.

As soon as the monitoring unit 127 detects a voltage on the auxiliary on-board supply system 103 or the on-board power supply system 101, the unit provides a signal to the module control 125 which in step 51 queries the measuring sensor 126 with regard to the current battery voltage on the supply line 123.

Further, the module control 125 simultaneously determines multiple identification parameters from an internal memory, which characterize the module 120 with regard to model and manufacturer. In step 52, the module control 125 sends an identification signal to the control device 107 via the CAN bus system 102. The identification signal comprises the following information in the present embodiment:

Manufacturer ID: 005
Model ID: 125
Battery voltage: 42.5 V

In this context, the manufacturer ID corresponds to a particular manufacturer of the module, assigned accordingly to the ID. The model ID corresponds to the functionality "source of energy-battery".

The control device 107 receives the identification signal in step 53 and queries the compatibility parameters of the vehicle from the database stored in the memory unit 112. In the present embodiment, the database comprises the following parameters:

Allowed manufacturers: 002-008, 057, 062, 118-255
Allowed module models: 014-042, 48, 87, 125, 144
Maximum voltage on-board
power supply system: 43.8 V
Minimum voltage on-board
power supply system: 30.0 V The control device 107 compares in step 54 at first the parameters comprised in the identification signal with the compatibility parameters received from the database. As follows from the preceding tables, the module 120 is generally compatible with the vehicle and eligible for connection. The control device 107 sends according to step 55 an activation signal to the module control 125, which activates the electric motor 121a in step 56 and locks the module 120 to the vehicle. According to step 57, the control device 107 subsequently queries the measuring device 113 with regard to the present voltage of the on-board power supply system 101.

The query of the measuring device in step 57 is necessary, as the vehicle comprises also an internal vehicle battery 105 and the voltage of the battery 122 thus should only deviate marginally from the voltage of the battery 105. In the present embodiment, the voltage on the on-board power supply system 101 is 42.5 V.

The control device 107 compares this value to the battery voltage from the identification signal in step 58 and checks if the battery voltage of the module 120 does not deviate by more than ±0.05 V from the voltage of the on-board power supply system 101.

As this is the case in the present embodiment, the control device 107 sends in step 59 a second activation signal to the switch unit 124, connected to the module control 125, whereupon the supply line 123 and thus the battery 122 is connected to the on-board power supply system 101. The compatibility check ends in step 60.

The successful connection is indicated to the user by a green indicator lamp (not shown), such as for example a LED, which is arranged in the connecting element 121. Otherwise, a red indicator lamp (not shown) indicates in the connecting element 121 that a connection of the module 120 to the vehicle is not possible due to lack of compatibility. In this case, the electric motor 121a is being activated again to unlock module 121 from the interface 114.

During operation, the monitoring unit 127 remains active. If the predetermined maximum values for current or voltage are being exceeded, the monitoring unit 127 sends a signal to the module control 125, so that the switch unit 124 disconnects the connection between battery 122 and electric system 1 of the vehicle to avoid damages.

Certainly, the present invention is not limited to applications in which a module 120 is being connected to the vehicle 2, 2'. Also the connection of a first module, for example a charging station or charging unit, and of a second module, for example a rechargeable module with rechargeable battery, is conceivable.

The embodiments explained beforehand allow numerous modifications and additions. For example it is conceivable that
- the control unit 107 is integrally formed with the operating unit 106 and/or the motor control 111,
- the switch unit 124 is formed on the side of the vehicle or on the side of a charging unit,
- the switch unit 124 is integrally formed with the interface 114,
- only one or more than two interfaces 114 are arranged for connection to corresponding modules 120 in the electric system 100 of the vehicle or in a charging unit,
- the internal vehicle battery 105 is separably connected to one of the interfaces 114 by means of a connecting element 121,
- the CAN bus system 102 comprises optical signal lines in addition or as an alternative to the shown electric signal lines,
- the indicator lamps are arranged on the side of the vehicle or in a charging unit instead of at the connecting element 121 and/or
- the switch unit 124 is formed for separated switching of a feed line and a charging line, that are provided between module 120 and on-board power supply system 101.
- the module (3, 17, 120) is designed as a passive component, i.e. for example as extension or jumper cable, and comprises besides a connecting element (6, 6', 121) another plug-in connector or an interface (4, 4', 114) for connection to another module.

What is claimed is:

1. A modular vehicle system, for an electric vehicle, having at least:
   an on-board power supply system for energy supply of an electric drive unit of the vehicle,
   a control device,
   an interface connected to the on-board power supply system, and
   a first locking device arranged at the interface;
   the system comprising an electrical energy supplying module having:
      a module electric arrangement,
      a module control,
      a connecting element, which is connectable to the interface to allow an electrical connection of the module electric arrangement with the on-board power supply system for supplying electrical energy to replenish the on-board power supply system, and
      a second locking device, arranged at the connecting element, formed for engagement with the first locking device;
   the system further comprising an electrically operable locking drive, arranged at one of the locking devices to move at least one of the locking devices at least from a free position to a locking position; wherein
   the control device of the electric vehicle and the module control of the module are configured to communicate with each other using the interface in a compatibility mode upon connection of said connecting element of the module with the interface of the electric vehicle to determine an electrical compatibility of the electric vehicle with the module,
   during the compatibility mode, at least one electric operating parameter comprising at least a voltage or current of the module electric arrangement is compared with at least one electric compatibility parameter comprising at least a voltage or current of the on-board power supply system to determine whether a safe electrical operation of the electric vehicle with the module is possible, and wherein
   in case that the electric operating parameter corresponds to the electric compatibility parameter, an activation signal is sent to the at least one electrically operable locking drive to move at least one of the locking devices from the free position to the locking position, so as to lock the module with the vehicle.

2. The modular vehicle system according to claim 1, wherein the second locking device is movable between the free position and the locking position.

3. The modular vehicle system according to claim 1, wherein the electrically operable locking drive is arranged at the at least one connecting element.

4. The modular vehicle system according to claim 1, wherein the control device is further configured to send a deactivation signal to the at least one electrically operable locking drive and to unlock the connecting element and the interface.

5. The modular vehicle system according claim 1, wherein the connecting element is formed as plug-in connector.

6. The modular vehicle system according to claim 1, wherein a flexible connection means is arranged between the interface and the electric vehicle and/or between the connecting element and the module.

7. The modular vehicle system according to claim 1, wherein the first or the second locking device is formed as locking bolt.

8. The modular vehicle system according to claim 7, wherein the second or first locking device is formed as receptacle for the locking bolt.

9. The modular vehicle system according to claim 1, wherein a magnetic fixing is provided to fix in place and/or position the interface and the connecting element with each other.

10. An electric vehicle having at least:
an on-board power supply system for power supply of an electric drive unit,
a control device, configured for communication with a module control of an electrical energy supplying module,
an interface connected to the on-board power supply system for connection to a connecting element of the module for supplying electrical energy to replenish the on-board power supply system, and
a first locking device arranged at the interface, formed for engagement with a second locking device arranged at the connecting element, wherein
an electrically operable locking drive is arranged at least at one of the locking devices to move at least one of the locking devices at least from a free position to a locking position, and wherein
the control device of the electric vehicle is configured to communicate with the module control of the module using the interface in a compatibility mode upon connection of said connecting element of the module with said interface of the electric vehicle, wherein during said compatibility mode at least one electric operating parameter comprising at least a voltage or current of the module is compared with at least one electric compatibility parameter comprising at least a voltage or current of the on-board power supply system to determine whether a safe electrical operation of the electric vehicle with the module is possible, and in case that the electric operating parameter corresponds to the electric compatibility parameter, an activation signal is sent to the at least one electrically operable locking drive to move at least one of the locking devices from the free position to the locking position and thus to lock the module with the vehicle.

11. An electrical energy supplying module for connection to an electric vehicle having at least:
a module electric arrangement for connection to an on-board power supply system of the electric vehicle,
a module control, which is configured to communicate with a control device of the electric vehicle,
a connecting element, connectable to an interface of the electric vehicle for supplying electrical energy to replenish the on-board power supply system, and
a second locking device arranged at the connecting element, formed for engagement with a first locking device arranged at the interface of the vehicle, wherein
an electrically operable locking drive is arranged at one of the first and second locking devices to move at least one of the locking devices at least from a free position to a locking position, and wherein
the module control is further configured to communicate with the control device of the electric vehicle using the interface in a compatibility mode upon connection of said connecting element of the module with said interface of the electric vehicle, wherein during said compatibility mode at least one electric operating parameter comprising at least a voltage or current of the module is compared with at least one electric compatibility parameter comprising at least a voltage or current of the on-board power supply system to determine whether a safe electrical operation of the electric vehicle with the module is possible, and in case that the electric operating parameter corresponds to the electric compatibility parameter, an activation signal is sent to the at least one electrically operable locking drive to move at least one of the locking devices from the free position to the locking position and thus to lock the module with the vehicle.

12. A method for connecting an electric vehicle to an electrical energy supplying module, wherein
the electric vehicle comprises:
at least an on-board power supply system,
an interface connected to the on-board power supply system, and
a first locking device arranged at the interface; and
the electrical energy supplying module comprises at least:
a module electric arrangement,
a connecting element, and
a second locking device, arranged at the connecting element, which is formed for engagement with the first locking device, wherein
an electrically operable locking drive is arranged at one of the first and second locking devices to move at least one of the locking devices at least from a free position to a locking position, and wherein
upon connection of said connecting element of the module with the interface of the electric vehicle for supplying electrical energy to replenish the on-board power supply system, at least one electric operating parameter comprising at least a voltage or current of the module electric arrangement is compared with at least one electric compatibility parameter comprising at least a voltage or current of the on-board power supply system to determine whether a safe electrical operation of the electric vehicle with the module is possible, and in case that the electric operating parameter corresponds to the electric compatibility parameter, an activation signal is sent to the at least one electrically operable locking drive to move at least one of the locking devices from a free position to a locking position and thus to lock the module with the vehicle.

13. A modular vehicle system, comprising:
an electric vehicle, having at least:
a control device,
an interface for connection of an electrical energy supplying module,
a first locking device arranged at the interface, and
a flexible connection cable, arranged between the interface and the electric vehicle;
the system comprising the electrical energy supplying module, having at least:
a module control, which is configured to communicate with the control device of the vehicle,
a connecting element, connectable to the interface of the electric vehicle to allow an electrical connection between the module and the vehicle for supplying electrical energy to an on-board power supply system of the vehicle, and
a second locking device arranged at the connecting element, formed for engagement with the first locking device;
the system comprising an electrically operable locking drive at one of the locking devices to move at least one of the locking devices from a free position to a locking position; wherein
upon connection of the connecting element of the module with the interface of the vehicle by a user,
the locking devices remain in the free position,
the module control sends an identification signal to the control device of the vehicle using the interface,
the control device upon reception of said identification signal compares the identification signal with at least one compatibility parameter comprising at least a voltage or current to determine whether a safe electrical operation of the electric vehicle with the module is possible, and only in case that the identification signal corresponds to the compatibility parameter, an activation signal is sent to the at least one electrically operable locking drive to move at least one of the locking devices from a free position to a locking position and thus to lock the module with the vehicle.

14. The modular vehicle system according to claim 13, further comprising at least one switching unit, which provides a switchable electric connection of the module electric arrangement with the on-board power supply system, wherein after the activation signal is sent to the at least one electrically operable locking drive, a second activation signal is sent to the at least one switching unit to electrically connect the module electric arrangement with the on-board power supply system.

15. The modular vehicle system according to claim 13, wherein the connecting element is formed as plug-in connector.

16. The modular vehicle system according to claim 13, wherein said module is a battery charger.

17. The modular vehicle system according to claim 1, further comprising at least one switching unit, which provides a switchable electric connection of the module electric arrangement with the on-board power supply system, wherein after the activation signal is sent to the at least one electrically operable locking drive, a second activation signal is sent to the at least one switching unit to electrically connect the module electric arrangement with the on-board power supply system.

18. The modular vehicle system according to claim 1, wherein during the compatibility mode, an identification signal is sent from the module control to the control device and the electric operating parameter is determined from the identification signal by the control device.

19. The modular vehicle system according to claim 1, further comprising an electrical measuring unit, configured to determine the electric operating parameter by measurement.

20. The modular vehicle system according to claim wherein said module is a battery charger.

* * * * *